(12) United States Patent　　(10) Patent No.:　US 12,688,444 B2
Otto et al.　　(45) Date of Patent:　Jul. 21, 2026

(54) METHOD FOR CONTROLLING A TECHNICAL SYSTEM

(71) Applicant: Robert Bosch GmbH, Stuttgart (DE)

(72) Inventors: Fabian Otto, Tuebingen (DE);
Gerhard Neumann, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 546 days.

(21) Appl. No.: 18/356,088

(22) Filed: Jul. 20, 2023

(65) Prior Publication Data

US 2024/0046126 A1　　Feb. 8, 2024

(30) Foreign Application Priority Data

Aug. 3, 2022　(DE) ..................... 10 2022 208 082.3

(51) Int. Cl.
　G06N 7/01　　　(2023.01)
(52) U.S. Cl.
　CPC ..................................... G06N 7/01 (2023.01)
(58) Field of Classification Search
　CPC ..................................................... G06N 7/01
　See application file for complete search history.

(56) References Cited

U.S. PATENT DOCUMENTS

| | | | | |
|---|---|---|---|---|
| 11,138,467 | B2 * | 10/2021 | Klepper | ................... G06N 3/08 |
| 12,485,541 | B1 * | 12/2025 | Lu | ........................... B25J 9/1674 |
| 2019/0232489 | A1 * | 8/2019 | Pascanu | ................. G06N 3/008 |
| 2020/0086483 | A1 * | 3/2020 | Li | ........................... B25J 9/1653 |
| 2020/0410342 | A1 * | 12/2020 | Willers | ................ G06N 3/0985 |
| 2022/0105625 | A1 * | 4/2022 | Guo | ........................ B25J 9/1661 |
| 2022/0161424 | A1 * | 5/2022 | Guo | ........................ B25J 9/1697 |
| 2022/0269226 | A1 * | 8/2022 | Hein | ........................ G05B 9/02 |
| 2023/0321826 | A1 * | 10/2023 | Spies | ..................... B25J 9/1661 |
| | | | | 700/245 |
| 2023/0364776 | A1 * | 11/2023 | Chau | .......................... B25J 9/02 |
| 2024/0119363 | A1 * | 4/2024 | Vuorio | ................ G06N 3/0455 |
| 2025/0224737 | A1 * | 7/2025 | Bohez | .................. G06N 3/0499 |

OTHER PUBLICATIONS

Xi et al., "Balance Control of a Biped Robot On a Rotating Platform Based On Efficient Reinforcement Learning," IEEE/CAA Journal of Automatica Sinica, vol. 6, No. 4, 2019, pp. 938-951.
Wang et al., "Lifelong Incremental Reinforcement Learning With Online Bayesian Inference," IEEE Transactions On Neural Networks and Learning Systems, vol. 33, No. 8, 2022, pp. 4003-4016.

* cited by examiner

*Primary Examiner* — David E Choi
(74) *Attorney, Agent, or Firm* — NORTON ROSE FULBRIGHT US LLP

(57)　　　ABSTRACT

A method for controlling a technical system. The method includes: ascertaining, as a first probability distribution, a probability distribution for a specification of a first chain of actions to perform based on a first state of the technical system to control the technical system; selecting an action for the first state according to the first probability distribution and controlling the technical system accordingly; ascertaining a second state which the technical system has entered by performing the first action; ascertaining by Bayesian inference, as a second probability distribution, a probability distribution for a specification of a second chain of actions to perform based on the second state; selecting an action for the second state according to the second probability distribution and controlling the technical system according to the selected action for the second state.

10 Claims, 3 Drawing Sheets

300 ascertain first probability distribution —301 ascertain action for the first state —302 ascertain second state —303 ascertain second probability distribution —304 ascertain action for the second state —305 control technical system according to selected action for the second state —306

METHOD FOR CONTROLLING A TECHNICAL SYSTEM

CROSS REFERENCE

The present application claims the benefit under 35 U.S.C. § 119 of German Patent Application No. DE 10 2022 208 082.3 filed on Aug. 3, 2022, which is expressly incorporated herein by reference in its entirety.

FIELD

The present disclosure relates to a method for controlling a technical system.

BACKGROUND INFORMATION

A robotic device (e.g., a robotic arm but also a vehicle that is to be able to navigate through an environment) can be trained by reinforcement learning (RL) to perform a particular task, e.g., in manufacturing.

In reinforcement training, an agent (e.g., a control unit for a robotic device) learns to act optimally solely by interacting with its environment. In order to discover rewarding behavioral patterns, agents should therefore effectively explore their environment. For continuous control tasks, exploration is often achieved by using a stochastic strategy, typically a Gaussian distribution over the next action of the agent, which depends on the current state of the environment. Gaussian strategies generate action patterns by adding independent Gaussian noise to the output of a deterministic function applied to state information of the environment.

Consequently, the actions are stochastically dependent on one another solely as a result of the stochasticity of the state transition dynamics of the environment, which leads to action sequences of low temporal coherence. This phenomenon is problematic since non-coherent courses of action can lead to inefficient random walk exploration behavior, which reduces data efficiency or completely prevents the discovery of optimal behavioral patterns. In addition, incoherent exploration often results in non-smooth action trajectories, which can lead to jerky behavior or even hardware damage in many physical systems (e.g., robotic actuators).

Approaches that can be used to achieve temporally coherent exploration in the action space in reinforcement learning are therefore desirable.

SUMMARY

According to various example embodiments of the present invention, a method for controlling a technical system is provided, comprising ascertaining, as a first probability distribution, a probability distribution for a specification of a first chain of actions to perform based on a first state of the technical system in order to control the technical system; selecting an action for the first state according to the first probability distribution and controlling the technical system according to the selected action for the first state; ascertaining a second state which the technical system has entered by performing the first action; ascertaining by Bayesian inference, as a second probability distribution, a probability distribution for a specification of a second chain of actions to perform based on the second state, wherein the first probability distribution is used as the a priori distribution and the second probability distribution is ascertained from the a posteriori distribution; selecting an action for the second state according to the second probability distribution and controlling the technical system according to the selected action for the second state.

The method described above enables, by the use of probability distributions over chains of (two or more, e.g., three, four, five or more) actions and updating them using Bayesian inference, a temporal correlation (i.e., correlation over time steps, wherein each action is mapped to a time step) of the actions and thus temporally coherent behavior of the controller over a control pass (from initial state to final state, e.g., target state). A plan over several actions is thus made. The method requires neither specific domain knowledge nor a trained environmental model and can be used with any training algorithm that permits a recurrent control policy.

Bayesian inference can be considered as replanning when a new state (here the second state) is observed, wherein the method can be continued iteratively (i.e., the second state takes the position of the first state and a third state takes the position of the second state, etc.)

Selecting an action for a state according to a respective probability distribution for a specification of a chain of actions means that a specification of a chain is sampled and the first action of this chain is selected as the action. This may comprise decoding the sampled specification into the chain of actions (or at least the first action of the chain, i.e., the action in the first position of the chain).

Various exemplary embodiments of the present invention are specified below.

Exemplary Embodiment 1 is a method for controlling a technical system, as described above.

Exemplary Embodiment 2 is one according to Exemplary Embodiment 1, wherein each action is mapped to a time step, wherein the a posteriori distribution is a distribution of a specification of a third chain of actions to perform based on the second state, which extends to a time step to which the first chain of actions extends, and wherein the second probability distribution is ascertained from the a posteriori distribution by expanding the a posteriori distribution to an action of a further time step after the time step to which the first chain of actions extends.

In other words, the a posteriori distribution, which is initially for a chain that is one action shorter than the first chain (since it is already conditioned to the second state and the action at the beginning of the first chain has thus been omitted), is expanded to a probability distribution for a chain (namely, the second chain) that is as long as the second chain (but shifted by one time step so that it extends one time step further into the future). This ensures that the first distribution and the second distribution are distributions of action chains of the same length and that a further action can in particular always be sampled (since it is clearly avoided that the chain shrinks to the length zero when the Bayesian inference is applied repeatedly).

Exemplary Embodiment 3 is a method according to Exemplary Embodiment 1 or 2, wherein the a posteriori distribution is expanded by means of a linear stochastic prediction model specified by the output that a neural prediction network outputs for the second state.

Thus, a control policy can in particular be trained by training the neural prediction network (referred to as the second neural network in the examples below) so that, for example, an RL loss is minimized (or reduced).

Exemplary Embodiment 4 is a method according to one of Exemplary Embodiments 1 to 3, wherein the first probability distribution, the second probability distribution and the plausibility distribution of the Bayesian inference are Gaussian distributions.

This enables simple performance of the Bayesian inference.

Exemplary Embodiment 5 is a method according to one of Exemplary Embodiments 1 to 4, wherein the specifications are latent representations of the respective chains so that the first probability distribution and the second probability distribution are factorized Gaussian distributions.

This further simplifies the performance of the Bayesian inference, which in particular simplifies reverse propagation (back propagation) during training.

Exemplary Embodiment 6 is a method according to one of Exemplary Embodiments 1 to 5, wherein the plausibility distribution (i.e., the likelihood distribution) in the Bayesian inference is a distribution of state information of the second state, which state information is ascertained from the second state by means of a neural coding network.

The neural coding network (referred to as the first neural network in the examples below) creates additional degrees of freedom during training (e.g., in addition to the prediction network) and is adapted during training to extract the relevant state information from the respective state.

Exemplary Embodiment 7 is a method for training an agent to control a technical system by controlling the technical system, in several control passes, according to the method according to one of Exemplary Embodiments 1 to 6 and adapting the agent according to an optimization of a training target function.

In this case, the adaptation can take place via parameters of ascertaining the second probability distribution from the a posteriori distribution (in particular by adapting the prediction network) and/or via ascertaining the plausibility distribution of the Bayesian inference (in particular by adapting the plausibility network). Adapting the agent according to an optimization is to be understood as a search for an optimum (which is not necessarily reached), for example so that the training target function is reduced or increased, depending on how it is formulated.

Exemplary Embodiment 8 is a method according to one of Exemplary Embodiments 1 to 7, wherein the training target function has at least one regularization term that rewards a correlation between the actions in the second probability distribution.

In this way, it is ensured that in the case of a long chain of actions, the correlation between the actions is not lost in one control pass. For example, the agent may be trained (by means of a regularization term) such that the probability distributions resemble a first-order autoregressive process (and a high correlation between successive time steps is thus forced). For example, a regularization term may also be provided that penalizes extensive updates to the distribution (i.e., big changes from the first to the second distribution) so that the agent is forced to effectively plan ahead.

Exemplary Embodiment 9 is a control unit configured to perform a method according to one of Exemplary Embodiments 1 to 8.

Exemplary Embodiment 10 is a computer program comprising instructions that, when executed by a processor, cause the processor to perform a method according to one of Exemplary Embodiments 1 to 8.

Exemplary Embodiment 11 is a computer-readable medium storing instructions that, when executed by a processor, cause the processor to perform a method according to one of Exemplary Embodiments 1 to 8.

In the figures, similar reference signs generally refer to the same parts throughout the various views. The figures are not necessarily to scale, wherein emphasis is instead generally placed on representing the principles of the present invention.

In the following description, various aspects are described with reference to the figures.

DETAILED DESCRIPTION OF EXAMPLE EMBODIMENTS

The following detailed description relates to the figures, which show, for clarification, specific details and aspects of this disclosure in which the present invention may be implemented.

Other aspects can be used, and structural, logical, and electrical changes can be carried out without departing from the scope of protection of the present invention. The various aspects of this disclosure are not necessarily mutually exclusive since some aspects of this disclosure may be combined with one or more other aspects of this disclosure to form new aspects.

Various examples are described in more detail below.

Figure 1:
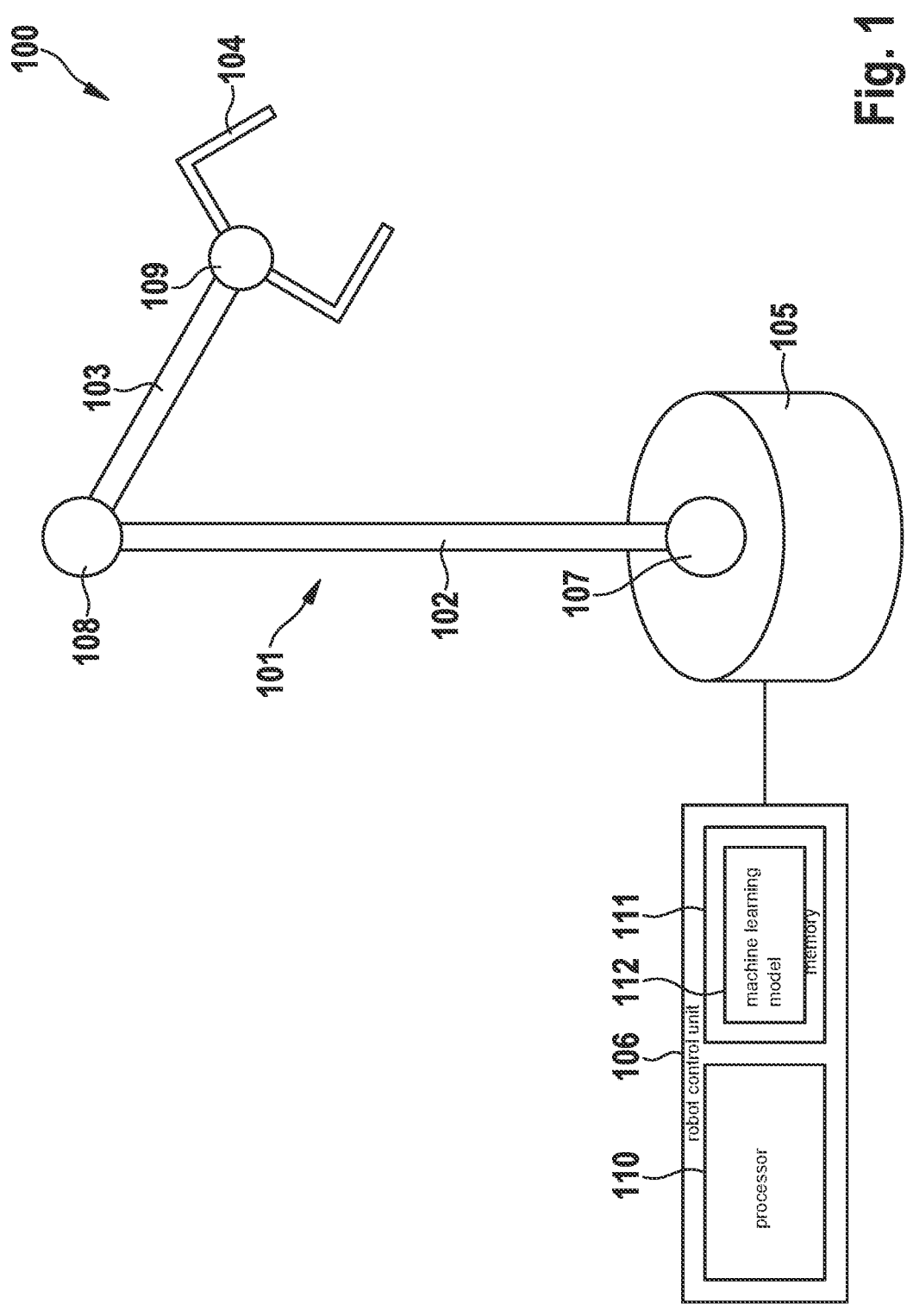
FIG. 1 shows a robot, according to an example embodiment of the present invention.

FIG. 1 shows a robot 100.

The robot 100 includes a robotic arm 101, for example an industrial robotic arm for handling or assembling a work piece (or one or more other objects). The robotic arm 101 includes manipulators 102, 103, 104 and a base (or support) 105 by means of which the manipulators 102, 103, 104 are supported. The term "manipulator" refers to the movable components of the robotic arm 101, the actuation of which allows physical interaction with the environment in order to, e.g., perform a task. For controlling, the robot 100 includes a (robot) control unit 106 designed to implement the interaction with the environment according to a control program. The final component 104 (which is furthest from the support 105) of the manipulators 102, 103, 104 is also referred to as the end effector 104 and may include one or more tools, such as a welding torch, gripping tool, painting device, or the like.

The other manipulators 102, 103 (which are closer to the support 105) may form a positioning device so that, together with the end effector 104, the robotic arm 101 is provided with the end effector 104 at its end. The robotic arm 101 is a mechanical arm that can provide functions similar to those of a human arm (possibly with a tool at its end).

The robotic arm 101 may include articulation elements 107, 108, 109 connecting the manipulators 102, 103, 104 to one another and to the support 105. An articulation element 107, 108, 109 may have one or more articulation joints that may each provide rotary movement (i.e., rotational movement) and/or translatory movement (i.e., displacement) for associated manipulators relative to one another. The movement of the manipulators 102, 103, 104 may be initiated by means of actuators controlled by the control unit 106.

The term "actuator" may be understood to mean a component designed to produce a mechanism or process in response to being driven. The actuator may implement instructions (the so-called activation), created by the control unit 106, into mechanical movements. The actuator, e. g., an electromechanical converter, may be designed to convert, in response to being activated, electrical energy into mechanical energy.

The term "control unit" may be understood to mean any type of logic-implementing entity that may include, for example, a circuit and/or a processor which is capable of executing software, firmware, or a combination thereof stored in a storage medium, and which can issue instructions, for example to an actuator in the present example. For example, the control unit may be configured by program code (e.g., software) to control the operation of a system, of a robot in the present example.

In the present example, the control unit 106 includes one or more processors 110 and a memory 111 that stores code and data based on which the processor 110 controls the robotic arm 101. According to various embodiments, the control unit 106 controls the robotic arm 101 on the basis of a machine learning model 112 which is stored in the memory 111 and implements a control policy.

One way to learn a control policy is reinforcement learning (RL). Reinforcement learning is characterized by a trial-and-error search and a delayed reward. In contrast to supervised learning of a neural network, which requires labels to learn from, reinforcement learning uses a trial-and-error mechanism to learn a mapping of states to actions such that an obtained reward is maximized. By trial and error, RL algorithms attempt to discover the actions that lead to higher rewards, by trying out various ones. Selecting an action affects not only the reward of the current state but also the rewards of all upcoming states (of the current control pass) and thus a delayed (total) reward or, in other words, a cumulative reward.

Reinforcement training may formally be called a Markov decision process (MDP) comprising a set of states S, a set of actions $\mathcal{A}$, a distribution over start states $p(s_0)$, a state transition distribution $p(s_{t+1}|s_t, a_t)$, a reward function $r(s_t, a_t, s_{t+1})$ and a discount factor $\gamma \in \mathbb{R}$. In each time step t, the agent (which is learning, i.e., is being trained) observes the state $s_t \in S$ of the respective environment (e.g., pose of the robotic arm 101 and the location of objects or obstacles in its working area) and selects an action $a_t \in \mathcal{A}$ according to a control policy distribution $\pi(a_t|s_t)$. The environment then transitions into a new state $s_{t+1} \sim p(s_{t+1}|s_t, a_t)$, and the agent receives a reward $r_t = r(s_t, a_t, s_{t+1})$. The following assumes an episodic scenario in which the learning objective is to find an optimal control policy $\pi^*$ that maximizes the expected sum of discounted rewards over a time horizon T:

$$\pi^* = \arg\max_{\pi} \mathbb{E}\left[\sum_{t=0}^{T-1} \gamma^t r_t\right]$$

Gaussian control policies parameterize a Gaussian distribution over the action $a_t$ to be performed next given the current state $s_t$:

$$\pi(a_t|s_t) = \mathcal{N}(a_t; \mu(s_t), \Sigma(s_t))$$

Here, the mean value $\mu(s_t)$ and the Cholesky decomposition $L(s_t)$ of the covariance matrix $$\Sigma(s_t) = L(s_t)L^T(s_t)$$

are parameterized by a deterministic function f: $s_t \rightarrow \mu(s_t)$, $L(s_t)$). It follows that the sampling of actions from the control policy amounts to adding white Gaussian noise $\epsilon_t$ to the mean value function $\mu(s_t)$:

$$a_t = \mu(s_t) + L(s_t)\epsilon_t, \epsilon_t \sim \mathcal{N}(0, I)$$

Since the noise in each time step is independent of the noise of the other time steps, i.e., $\epsilon_t \perp \epsilon_{t+k} \forall k \neq 0$, the actions are dependent on one another only via the dynamics of the state transitions, which results in low temporal coherence between the actions. This is particularly problematic in the early stages of learning: Since Gaussian policies are typically initialized so that they have a fixed mean value and a fixed covariance, i.e., $\mu(s) \approx \mu_0$, $L(s) \approx L_0 \forall_s \in S$, the initial action trajectories (i.e., the sequences of actions) have completely uncorrelated actions:

$$\mathbb{C}[a_t, a_{t+k}] = \mathbb{C}[\mu_0 + L_0 e_t, \mu_0 + L_0 e_{t+k}] = L_0 \mathbb{C}[e_t, e_{t+k}]L_0^T = 0 \ \forall \ k \neq 0$$

According to various embodiments, increased temporal coherence of actions is achieved by using a (recurrent) control policy that parameterizes a distribution of the next d+1 actions $a_{t:t+d} = \{a_t, a^{t+1}, \ldots, a^{t+d}\}$ (instead of only a single action):

$$\pi(a_{t:t+d}|s_t, \tau_{t-1}) = \mathcal{N}(a_{t:t+d}; \mu^t, \Sigma^t)$$

Here, $\tau_{t-1} := \{s_1, a_1, \ldots, s_{t-1}, a_{t-1}\}$ denotes the state-action trajectory up to the time step t−1 and $\mu^t$ and $\Sigma^t$ denote the mean value and the covariance matrix of the distribution $a_t$, the time step t. The action $a_t$ is sampled from the respective edge distribution (marginal distribution):

$$a_t \sim \mathcal{N}(a_t; \mu_1^t, \Sigma_{11}^t)$$

It is assumed that the agent is able to perfectly plan its actions in advance so that the observation of new state information does not change the distribution of the control policy over future actions:

$$\pi(a_{t:t+d}|\tau_{t-1}) = \pi(a_{t:t+d}|s_t, \tau_{t-1}) \tag{1}$$

Then, the action $a_t$ that the agent (e.g., control unit 106) selects in the time step t correlates with the next d actions (e.g., d=5) according to the covariance matrix $\Sigma^t$:

$$\mathbb{C}[a_t, a_{t+k}] = \sum_{1(k+1)}^t, 1 \leq k \leq d \tag{2}$$

As a result, a given degree of correlation between actions can be achieved by constructing a suitable covariance matrix $\Sigma^t$. According to various embodiments, a covariance matrix $\Sigma^t$ is constructed or sought so that it resembles a first-order autoregressive process with parameters $\alpha \in (0,1)$ so that the off-diagonal block elements are given by $$\sum_{mn} = \alpha^{|m-n|} \sqrt{\sum_{mm} \odot \sum_{nn}} \ m \neq n \tag{3}$$

wherein $\Sigma_{nn}$ denotes the covariance matrix of the edge distribution over $a_{t+n-1}$, $\odot$ denotes the element-wise product, and the square root is calculated element-wise. Then, the correlation coefficient between two actions $a_t$ and $a_{t+k}$ is $$\rho_{a_t,a_{t+k}} = \frac{\mathrm{Cov}\,[a_t, a_{t+k}]}{\sqrt{\mathrm{Var}\,[a_t]\,\mathrm{Var}\,[a_{t+k}]}} = \frac{\alpha^{|k+1-1|}\sqrt{\sum_{11} \odot \sum_{(k+1)(k+1)}}}{\sqrt{\sum_{11} \odot \sum_{(k+1)(k+1)}}} = \alpha^{|k|}$$

(5)

for $1 \leq k \leq d$. Consequently, the degree of temporal coherence between actions is determined by the parameter $\alpha$.

However, the assumption that the agent perfectly plans its actions in advance is unrealistic for most non-trivial cases since the agent typically must adapt its action plan according to the most recent state information (i.e., the state information it currently has received as the most recent one) in order to behave optimally. Therefore, according to various embodiments, the left side of equation (1) is treated as a prior distribution over future actions (before the state $s_{t+1}$ is observed) and the right side of equation (1) is considered a posterior distribution (after the state $s_{t+1}$ has been observed). Moreover, the control policy is regularized during the training so that the consistency assumption of equation (1) approximately applies, whereby, descriptively speaking, the agent is motivated to effectively plan ahead, but is also enabled to alter its action plan if necessary. Empirically, it can be observed that if the consistency assumption of equation (1) approximately applies, actions are approximately correlated according to the covariance matrix $\Sigma^t$ and the resulting action trajectories are consequently temporally coherent.

In order to force a temporally coherent exploration, according to various embodiments, a recurrent control policy (e.g., implemented by one or more recurrent neural networks) is trained and used in which the hidden state $$z_t = \left(\mu_t^-, \sum_t^-\right)$$

parameterizes an a priori distribution (i.e., a prior distribution)

$$p\ (a_{t:t+d}\,|\,\tau_{t-1}) = \mathcal{N}\left(a_{t:t+d}; \mu_t^-, \sum_t^-\right)$$

over the next d actions $a_{t:t+d} = \{a_t, a_{t+1}, \ldots, a_{t+d}\}$ under the condition of all preceding states and actions (of the current control pass).

Figure 2:
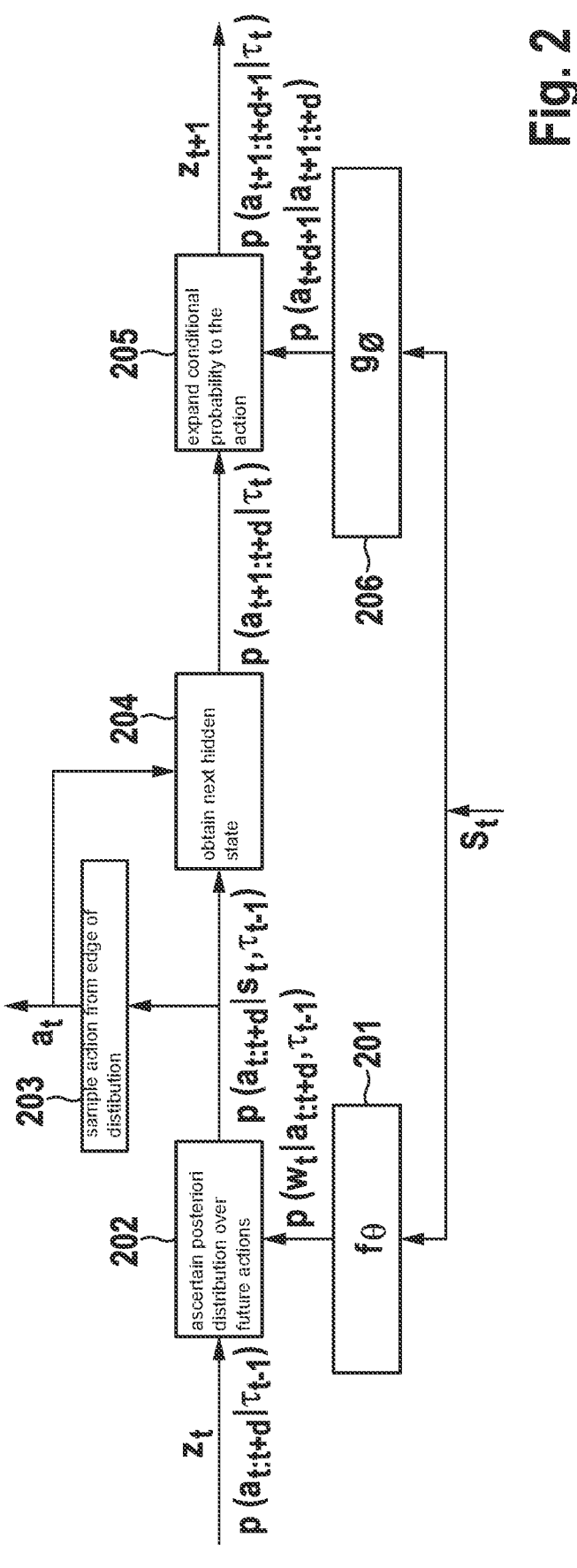
FIG. 2 illustrates a temporally coherent control policy according to one example embodiment of the present invention.

FIG. 2 illustrates a temporally coherent control policy according to one embodiment.

First, a first neural network 201

$$f_\theta : s_t \to \left(w_t, \sum_t^w\right)$$

encodes the information of the most recently reached (i.e., current) state $S_t$ and its uncertainty. It is assumed that such coding captures any additional information obtained by observation of $S_t$, so that $p(a_{t:t+d}|w_t, \tau_{t-1}) = p(a_{t:t+d}|s_t, \tau_{t-1})$ The observation model $$p(w_t\,|\,a_{t:t+d}, \tau_{t-1}) = \mathcal{N}\left(w_t\,|\,a_{t:t+d}, \sum_t^w\right)$$

is then used to ascertain, in 202, an a posteriori distribution (i.e., a posterior distribution) over future actions under the condition of the most recently observed state $s_t$:

$$p(a_{t:t+d}\,|\,s_t, \tau_{t-1}) \propto p(w_t\,|\,a_{t:t+d}, \tau_{t-1})p(a_{t:t+d}\,|\,\tau_{t-1}) = \tag{4}$$
$$\mathcal{N}\left(a_{t:t+d}; \mu_t^+, \sum_t^+\right)$$

$$\mu_t^+ = \mu_t^- + \left(\sum_t^w + \sum_t^-\right)^{-1} \sum_t^- (w_t - \mu_t^-)$$

$$\sum_t^+ = \sum_t^w \left(\sum_t^w + \sum_t^-\right)^{-1} \sum_t^-$$

The agent then samples, in 203, the action $a_t$ from the edge distribution $p(a_t|s_t, \tau_{t-1})$.

The next hidden state $z_{t+1}$ defining the new prior distribution $p(a_{t+1:t+d+1}|\tau_t)$ is obtained in that the posterior distribution of equation (4) is first conditioned, in 204, to the sampled action $a_t$, resulting in the conditional distribution $$p(a_{t+1:t+d}\,|\,\tau_t) = \mathcal{N}\left(a_{t:t+d}; \mu_t^c, \sum_t^c\right).$$

Secondly, in 205, the linear stochastic prediction model $$p(a_{t+d+1}|a_{t+1:t+d}) = \mathcal{N}(K_t a_{t+1:t+d} + b_t, A_t),$$

which is parameterized by a second neural network 206 $g_\phi : s_t \to (K_t, b_t, A_t)$, is used to expand the conditional probability to the action $a_{t+d+1}$:

$$p(a_{t+1:t+d+1}|\tau_t) = \mathcal{N}(a_{t+1:t+d+1}, \mu_{t+1}^-, \Sigma_{t+1}^-)$$

$$\mu_{t+1}^- = \begin{pmatrix} \mu_t^c \\ K_t\mu_t^c + b_t \end{pmatrix}$$

$$\Sigma_{t+1}^- = \begin{pmatrix} \Sigma_t^c & \Sigma_t^c K_t^T \\ K_t\Sigma_t^c d & K_t\Sigma_t^c K_t^T + \Lambda_t \end{pmatrix}$$

This is the a priori distribution over the future actions $a_{t+1:t+d+1}$ that is given by the hidden state $Z_{t+1}$.

The control policy described above can be trained by means of any control policy search algorithm that accepts recurrent control policies (such as proximal policy optimization or trust region layers). According to various embodiments, the control policy is regularized by adding two penalty terms $$P_t^{(1)} \text{ and } P_t^{(2)}$$

to the (standard) RL target function $RL_{loss}$ of the control policy search algorithm used, so that the training of the control policy corresponds to finding a solution for the optimization problem $$\max_{\theta,\phi} RL_{loss} - \mathbb{E}_t\left[\lambda_1 P_t^{(1)} + \lambda_2 P_t^{(2)}\right]$$

wherein the RL target function $RL_{loss}$ in this example is selected such that it is maximized and $\mathbb{E}_t$ is the empirical mean over a finite batch of samples and $(\theta, \phi)$ are the weights of the (likelihood or plausibility) encoder $f_\theta$ or of the action prediction network $g_\phi$.

The first regularization term $$P_t^{(1)}$$

encourages the agent to be trained so that, after observing a new state, the agent only makes a small update of the prior distribution over future actions so that the agent learns to plan effectively in advance. For example, the first regularization term $$P_t^{(1)}$$

punishes the Kullback-Leibler (KL) divergence between the a priori distribution and the a posteriori distribution:

$$P_t^{(1)} = KL(p(a_{t:t+d}|s_t, \tau_{t-1})\|p(a_{t:t+d}|\tau_{t-1}))$$

$$= KL(\mathcal{N}(\mu_t^+, \Sigma_t^+)\|\mathcal{N}(\mu_t^-, \Sigma_t^-))$$

This penalty term approximately forces the consistency assumption of equation (1) so that future actions are approximately correlated according to the covariance matrix $$\Sigma_t^+$$

of the a posteriori distribution $p(a_{t:t+d}|s_t, \tau_{t-1})$.

The second regularization term encourages the training such that the posterior covariance matrix $$\Sigma_t^+$$

resembles a first-order autoregressive process with parameters $\alpha \in (0,1)$, which forces successive actions to be sufficiently correlated. The target covariance matrix $$\Sigma_t^*$$

is constructed to resemble the covariance matrix of a first-order autoregressive process as described in equation (3), so that $$P_t^{(2)} = KL\left(\mathcal{N}\left(\mu_t^+, \Sigma_t^+\right)\| \mathcal{N}\left(\mu_t^+, \Sigma_t^*\right)\right)$$

The correlation coefficient between two actions that are k steps apart is then approximately $\alpha^{|k|}$.

The first regularization term thus ensures that actions are correlated according to the posterior covariance matrix $$\Sigma_t^+,$$

while the second regularization term encourages that $$\Sigma_t^+$$

resembles the covariance matrix of a first-order autoregressive process.

However, in the approach described above, in order to apply Bayes' theorem to Gaussian distributions (see equation (4)) in order to update the distribution of the actions, inverting matrices is required. For the latter, reverse propagation (for adaptations of the weights in the training) can be difficult, especially for high-dimensional action spaces. According to various embodiments, the update is therefore carried out in a latent space where the distribution can be represented as a factorized Gaussian distribution, i.e., a latent variable z is introduced with $$p(z) = \mathcal{N}\left(\mu_z, \text{diag}(\sigma_z^2)\right).$$

Conditioning to newly observed state information then takes place in the latent space:

$$p(z|s_{1:t}) \propto p(w(s_t)|z)p(z|s_{1:t-1})$$

An action decoder can in this case be used to obtain the (predictive) action distribution. A simple example is a linear decoder, which results in a Gaussian distribution of the actions:

$$a_{t:t+d} = Wz_t + w_0$$

wherein W, in turn, can be parameterized so that only the temporal correlation is modeled and not between components of the actions. The resulting action distribution is given by $$p(a_{t:t+d}|s_{1:t}) =$$
$$\int p(z|s_{1:t})p(a_{t:t+d}|z)dz = \mathcal{N}\left(a_{t:t+d}|W\mu_z + w_0, W\text{diag}(\sigma_z^2)W^T\right)$$

The update, as in the example of FIG. 2, includes two steps:
1. conditioning to $a_t$ and
2. expanding the distribution to the next time step.

In this case, step 1 is simple and can take place by means of Gaussian conditioning. This again requires an inversion, but only the action covariance for the current time step must be inverted, which action covariance can be factorized).

Step 2 is more complicated in this case since the latent variable $z_t$ cannot be broken down into individual time steps, as is the case with the vector of future actions. According to one embodiment, an additional regularization term is therefore introduced, which forces the action distribution $p^-(a_{t+1:t+d}|s_{1:t})$ (which is decoded from the prior distribution for time step t+1) to be equivalent to the conditioned action distribution $p^+(a_{t+1:t+d}|s_{1:t}, a_t)$ (which is decoded from the posterior distribution of the previous time step):

$$\lambda_3 \mathbb{E}_{p(s_t)}[KL(p^-(a_{t+1:t+d}|s_{1:t})\|p^+(a_{t+1:t+d}|s_{1:t}, a_t))]$$

For the training (this also relates to other embodiments, e.g., the one of FIG. 2), the agent interacts with the environment by selecting and applying actions (i.e., controlling the respective technical system according to the selected actions), and the samples generated in the process (including the state transitions caused by the selected actions) are used for training the control policy (which is in particular implemented by the two neural networks) and, depending on the RL training method used, a V function (value function), for example.

Figure 3:
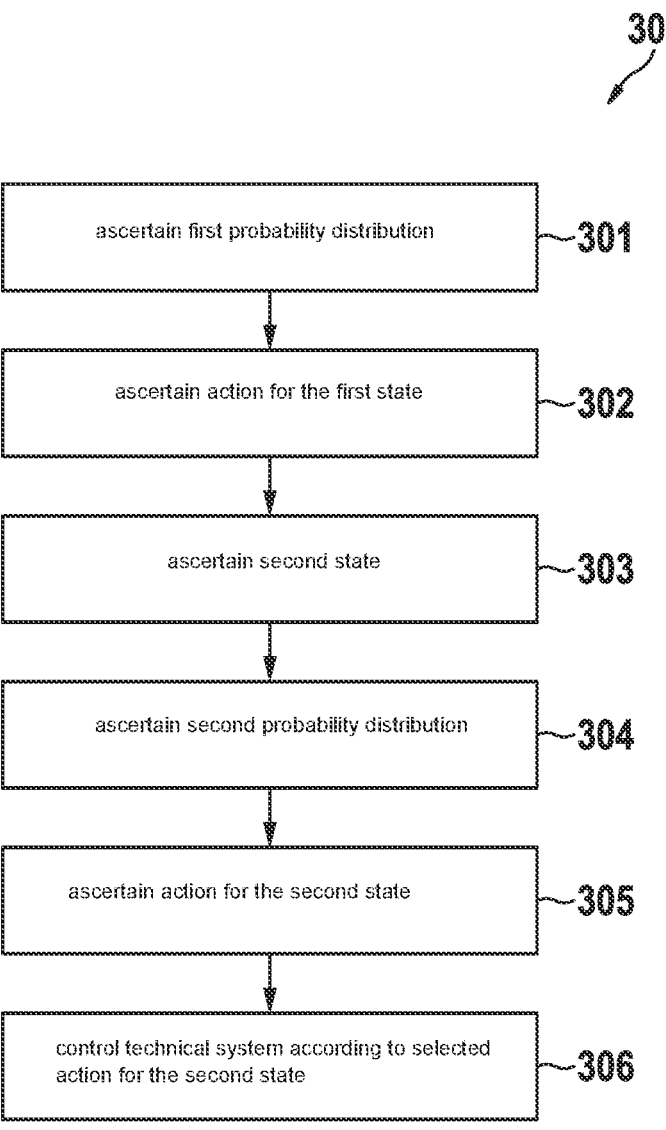
FIG. 3 shows a flow chart depicting a method according to one example embodiment of the present invention for controlling a robot to pick up and inspect an object.

In summary, according to various embodiments, a method as shown in FIG. 3 is provided.

FIG. 3 shows a flow chart 300 depicting a method according to one embodiment for controlling a robot to pick up and inspect an object.

At 301, a probability distribution for a specification of a first chain of actions to perform based on a first state of the technical system in order to control the technical system is ascertained as a first probability distribution.

At 302, an action for the first state is ascertained according to the first probability distribution and the technical system is controlled according to the selected action for the first state.

At 303, a second state is ascertained (i.e., observed, for example), which the technical system has entered by performing the first action.

At 304, a probability distribution for a specification of a second chain of actions to perform based on the second state is ascertained as a second probability distribution by Bayesian inference, wherein the first probability distribution is used as the a priori distribution and the second probability distribution is ascertained from the a posteriori distribution.

At 305, an action for the second state is ascertained according to the second probability distribution.

At 306, the technical system is controlled according to the selected action for the second state.

The method of FIG. 3 may be performed by one or more computers comprising one or more data processing units. The term "data processing unit" may be understood to mean any type of entity that enables the processing of data or signals. For example, the data or signals may be processed according to at least one (i.e., one or more than one) specific function performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination thereof. Any other way of implementing the respective functions described in more detail here can also be understood as a data processing unit or logic circuitry. One or more of the method steps described in detail herein may be performed (e.g., implemented) by a data processing unit by one or more specific functions performed by the data processing unit.

According to various embodiments, the method is thus, in particular, computer-implemented.

The approach of FIG. 3 is used to generate a control signal for a robotic device. The term "robotic device" may be understood as relating to any technical system (with a mechanical part whose movement is controlled), such as a computer-controlled machine, a vehicle, a household appliance, an electric tool, a manufacturing machine, a personal assistant, or an access control system. A control rule for the technical system is learned, and the technical system is then controlled accordingly. For example, the generation of an action (and of a corresponding control signal) consists in generating a continuous value or several continuous values (i.e., a regression is performed), such as for a distance, a speed, or an acceleration (according to which a robotic device or portion thereof is then moved, for example).

Various embodiments may receive and use sensor signals from various sensors, such as video, radar, lidar, ultrasound, movement, thermal imaging, etc., for example in order to obtain sensor data with regard to states of the controlled system (e.g., robot and object or objects in the environment). The sensor data can be processed. This may comprise classifying the sensor data or performing a semantic segmentation of the sensor data, for example in order to detect the presence of objects (in the environment in which the sensor data were obtained).

Embodiments can be used to train a machine learning system and to control a robot, e.g., by robot manipulators autonomously, in order to accomplish various manipulation tasks under various scenarios. In particular, embodiments are applicable to the control and monitoring of the performance of manipulation tasks, e.g., in assembly lines.

Although specific embodiments have been illustrated and described herein, the person skilled in the art recognizes that the specific embodiments shown and described can be substituted for a variety of alternative and/or equivalent implementations without departing from the scope of protection of the present invention. This application is to cover any adaptations or variations of the specific embodiments discussed herein.

What is claimed is:

1. A method for controlling a technical system, comprising the following steps:

ascertaining, as a first probability distribution, a probability distribution for a specification of a first chain of actions to perform based on a first state of the technical system in order to control the technical system;

selecting an action for the first state according to the first probability distribution and controlling the technical system according to the selected action for the first state;

ascertaining a second state which the technical system has entered by performing the first action;

ascertaining by Bayesian inference, as a second probability distribution, a probability distribution for a specification of a second chain of actions to perform based on the second state, wherein the first probability distribution is used as an a priori distribution and the second probability distribution is ascertained from the a posteriori distribution;

selecting an action for the second state according to the second probability distribution; and controlling the technical system according to the selected action for the second state.

2. The method according to claim 1, wherein each action is mapped to a time step, wherein the a posteriori distribution is a distribution of a specification of a third chain of actions to perform based on the second state, which extends to a time step to which the first chain of actions extends, and wherein the second probability distribution is ascertained from the a posteriori distribution by expanding the a posteriori distribution to an action of a further time step after the time step to which the first chain of actions extends.

3. The method according to claim 1, wherein the a posteriori distribution is expanded using a linear stochastic prediction model specified by an output that a neural prediction network outputs for the second state.

4. The method according to claim 1, wherein the first probability distribution, the second probability distribution and a plausibility distribution of the Bayesian inference are Gaussian distributions.

5. The method according to claim 1, wherein the specifications of a first chain of actions and of the second chain of actions are latent representations of the respective chains so that the first probability distribution and the second probability distribution are factorized Gaussian distributions.

6. The method according to claim 1, wherein a plausibility distribution in the Bayesian inference is a distribution of state information of the second state, which state information is ascertained from the second state using a neural coding network.

7. A method for training an agent to control a technical system by controlling the technical system, in several control passes, by:

ascertaining, as a first probability distribution, a probability distribution for a specification of a first chain of actions to perform based on a first state of the technical system in order to control the technical system, selecting an action for the first state according to the first probability distribution and controlling the technical system according to the selected action for the first state, ascertaining a second state which the technical system has entered by performing the first action, ascertaining by Bayesian inference, as a second probability distribution, a probability distribution for a specification of a second chain of actions to perform based on the second state, wherein the first probability distribution is used as an a priori distribution and the second probability distribution is ascertained from the a posteriori distribution, selecting an action for the second state according to the second probability distribution, and controlling the technical system according to the selected action for the second state; and adapting the agent according to an optimization of a training target function.

8. The method according to claim 7, wherein the training target function has a, least one regularization term that rewards a correlation between the actions in the second probability distribution.

9. A control unit configured to control a technical system, the control unit configured to:

ascertain, as a first probability distribution, a probability distribution for a specification of a first chain of actions to perform based on a first state of the technical system in order to control the technical system;

select an action for the first state according to the first probability distribution and controlling the technical system according to the selected action for the first state;

ascertain a second state which the technical system has entered by performing the first action;

ascertain by Bayesian inference, as a second probability distribution, a probability distribution for a specification of a second chain of actions to perform based on the second state, wherein the first probability distribution is used as an a priori distribution and the second probability distribution is ascertained from the a posteriori distribution;

select an action for the second state according to the second probability distribution; and control the technical system according to the selected action for the second state.

10. A non-transitory computer-readable medium on which is stored instructions for controlling a technical system, the instructions, when executed by a processor, causing the processor to perform the following steps:

ascertaining, as a first probability distribution, a probability distribution for a specification of a first chain of actions to perform based on a first state of the technical system in order to control the technical system;

selecting an action for the first state according to the first probability distribution and controlling the technical system according to the selected action for the first state;

ascertaining a second state which the technical system has entered by performing the first action;

ascertaining by Bayesian inference, as a second probability distribution, a probability distribution for a specification of a second chain of actions to perform based on the second state, wherein the first probability distribution is used as an a priori distribution and the second probability distribution is ascertained from the a posteriori distribution;

selecting an action for the second state according to the second probability distribution; and controlling the technical system according to the selected action for the second state.

* * * * *